United States Patent
Cao

(10) Patent No.: US 8,352,800 B2
(45) Date of Patent: Jan. 8, 2013

(54) UNIVERSAL SERIAL BUS SYSTEM AND METHOD

(75) Inventor: Xiang Cao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 362 days.

(21) Appl. No.: 12/727,247

(22) Filed: Mar. 19, 2010

(65) Prior Publication Data

US 2011/0173502 A1    Jul. 14, 2011

(30) Foreign Application Priority Data

Jan. 8, 2010  (CN) .......................... 2010 1 0300127

(51) Int. Cl.
*G06F 11/26* (2006.01)

(52) U.S. Cl. ............... 714/43; 714/4.5; 714/25; 714/27; 714/56

(58) Field of Classification Search .................... 714/43, 714/56
See application file for complete search history.

(56) References Cited

U.S. PATENT DOCUMENTS

| | | | |
|---|---|---|---|
| 7,702,984 B1* | 4/2010 | Lee et al. | 714/742 |
| 2002/0062416 A1* | 5/2002 | Kim et al. | 710/305 |
| 2009/0216517 A1* | 8/2009 | Herbst et al. | 703/21 |
| 2011/0040516 A1* | 2/2011 | Wang | 702/117 |
| 2011/0106980 A1* | 5/2011 | Liu | 710/8 |
| 2011/0126057 A1* | 5/2011 | Chang | 714/43 |

* cited by examiner

*Primary Examiner* — Chae Ko
(74) *Attorney, Agent, or Firm* — Altis Law Group, Inc.

(57) ABSTRACT

When a controller identifies a universal serial bus (USB) device connected to a USB interface, it outputs a control signal to close a relay and a first start test signal to an electronic device to test a USB interface of the electronic device. When the test of the USB interface is completed, to the controller adds one to an inside counter, and determines whether the count value reaches a preset count value. If the count value reaches the preset count value, the controller outputs a finish test signal to the electronic device. If the count value does not reach the preset count value, the controller controls the closed relay to open and outputs a second start test signal to close a next relay to test a next USB interface of the electronic device corresponding to the now closed relay.

2 Claims, 3 Drawing Sheets

UNIVERSAL SERIAL BUS SYSTEM AND METHOD

BACKGROUND

1. Technical Field

The present disclosure relates to test apparatuses and test methods, and particularly, to a method of testing universal serial bus (USB) interfaces.

2. Description of Related Art

Commonly deployed for communication between electronic devices, USB interfaces need to undergo testing after manufacture. A conventional USB interface testing method involves attempting interface connectivity using qualified USB devices such as USB mice, keyboards, and hard disk drive (HDD), to inspect quality and stability thereof. However, this method requires unnecessarily time-consuming, tedious plugging/unplugging between USB device(s) and interface(s), thus potentially damaging the USB device(s).

DETAILED DESCRIPTION

Figure 1:
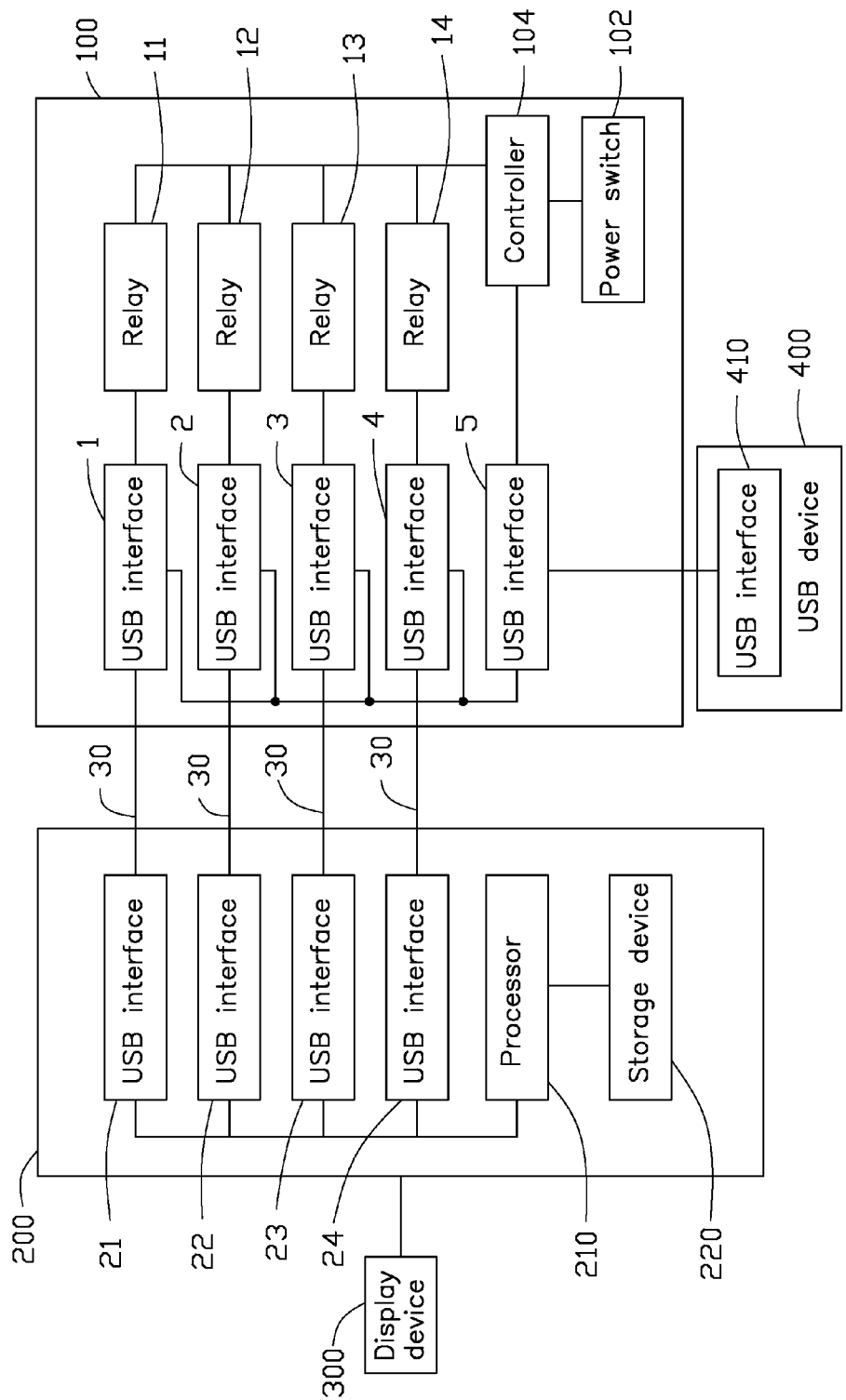
FIG. 1 is a block diagram of an embodiment of a test apparatus for universal serial bus (USB) interfaces.

Referring to FIG. 1, an exemplary embodiment of a test apparatus 100 is provided for testing universal serial bus (USB) interfaces of an electronic device, such as a computer motherboard 200. The test apparatus 100 includes a plurality of USB interfaces, a plurality of relays, a power switch 102, and a controller 104. In one embodiment, the USB interfaces of the motherboard 200 includes four USB interfaces 21-24, the plurality of USB interfaces of the test apparatus 100 includes five USB interfaces 1-5, and the plurality of relays includes four relays 11-14. The controller 104 includes a preset count value stored in an inside counter of the controller 104. The preset count value is equal to the number of the USB interfaces of the motherboard 200. The USB interfaces 1-4 are connected to the relays 11-14 respectively and also connected to the USB interface 5. The controller 104 is connected to the relays 11-14, the USB interface 5, and the power switch 102.

In one embodiment, the power switch 102 includes a button (not shown) set on a surface of the test apparatus 100. The controller 104 is a type 89C2051 controller.

A display device 300 is connected to the motherboard 200, to display a test result of each USB interface of the motherboard 200. The motherboard 200 further includes a processor 210, a storage device 220, and other elements (not shown); the other elements are known elements for a general-purpose computer, such as a chipset. Test programs for testing the USB interfaces of the motherboard 200 are stored in the storage device 220 of the motherboard 200. In one embodiment, the display device 300 is a liquid crystal display and the storage device 220 is a HDD.

In use, the USB interfaces 1-4 of the test apparatus 100 are connected to the USB interfaces 21-24 of the motherboard 200 via four cables 30, respectively, to communicate with the motherboard 200. The power switch 102 is configured to turn on/off the controller 104, namely, the power switch 102 is configured to turn on/off the test apparatus 100. The USB interface 5 of the test apparatus 100 is connected to a USB interface 410 of a qualified USB device 400, such as a USB keyboard, to communicate with the USB device 400. The controller 104 outputs control signals to control the relays 11-14 to open or close, and outputs start test signals to the processor 210 to read the test programs stored in the storage device 220 and execute the test programs for testing the USB interfaces 21-24 of the motherboard 200. In particular, when the USB device 400 is connected to the USB interface 5, the controller 104 identifies the USB device 400 and outputs a control signal to the relay 11, closing the relay 11. The controller 104 provides power to the USB interface 1 and outputs a first start test signal to the processor 210 via the USB interfaces 1 and 21. The processor 210 reads the test programs from the storage device 220 according to the start test signal and executes the test programs. If the processor 210 can communicate with the USB device 400 via the USB interfaces 21, 1, and 5, the USB interface 21 of the motherboard 200 is qualified. If the processor 210 cannot communicate with the USB device 400, the USB interface 21 of the motherboard 200 is unqualified. The display device 300 displays a test result of the USB interface 21.

When the test for the USB interface 21 is completed, the processor 210 outputs a test finish signal to the controller 104 through the USB interfaces 21 and 1, to add one to the inside counter according to the test finish signal and determine whether the count value of the inside counter reaches a preset count value. If the count value reaches the preset count value, the controller 104 outputs a finish test signal to the processor 210 through the USB interfaces 1 and 21, and then the processor 210 controls the display device 300 to indicate the end of the test. If the count value does not reach the preset count value, the controller 104 controls the relay 11 to open, and outputs a control signal to the relay 12 to control the relay 12 to close. The controller 104 provides power to the USB interface 2 and outputs a second start test signal to the processor 210 via the USB interfaces 2 and 22. The test theory for the USB interface 22 is identical to that of the USB interface 21. Other USB interfaces of the motherboard 200 can be tested by the same test theory.

Figure 2A:
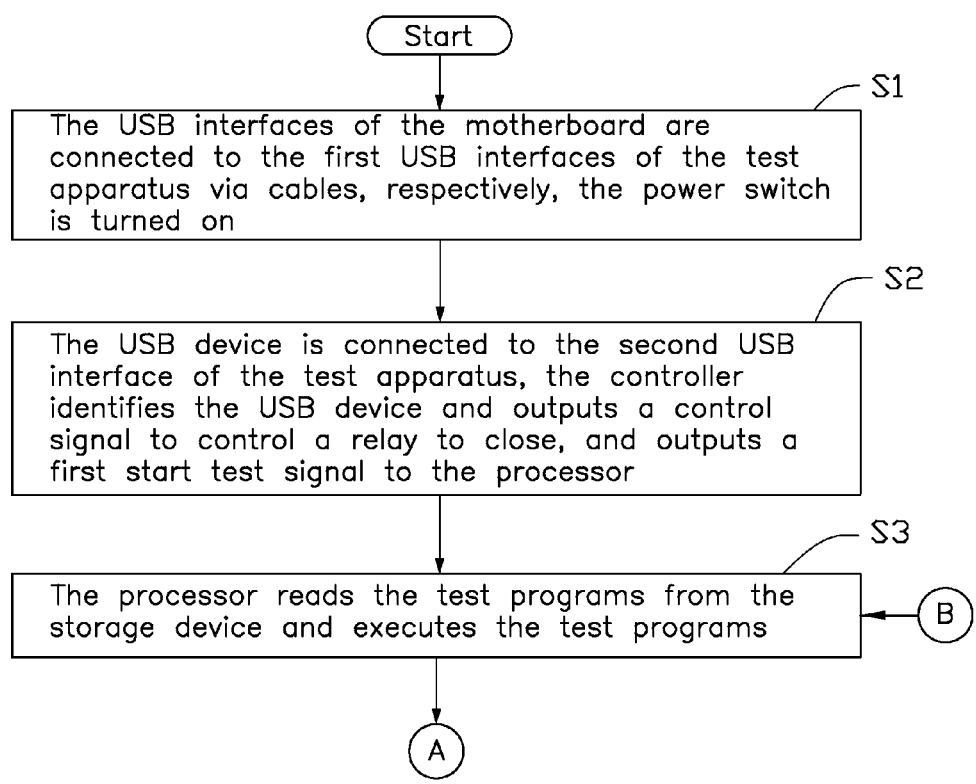
FIGS. 2A-2B is a flowchart of an embodiment of a test method for USB interfaces.
Figure 2B:
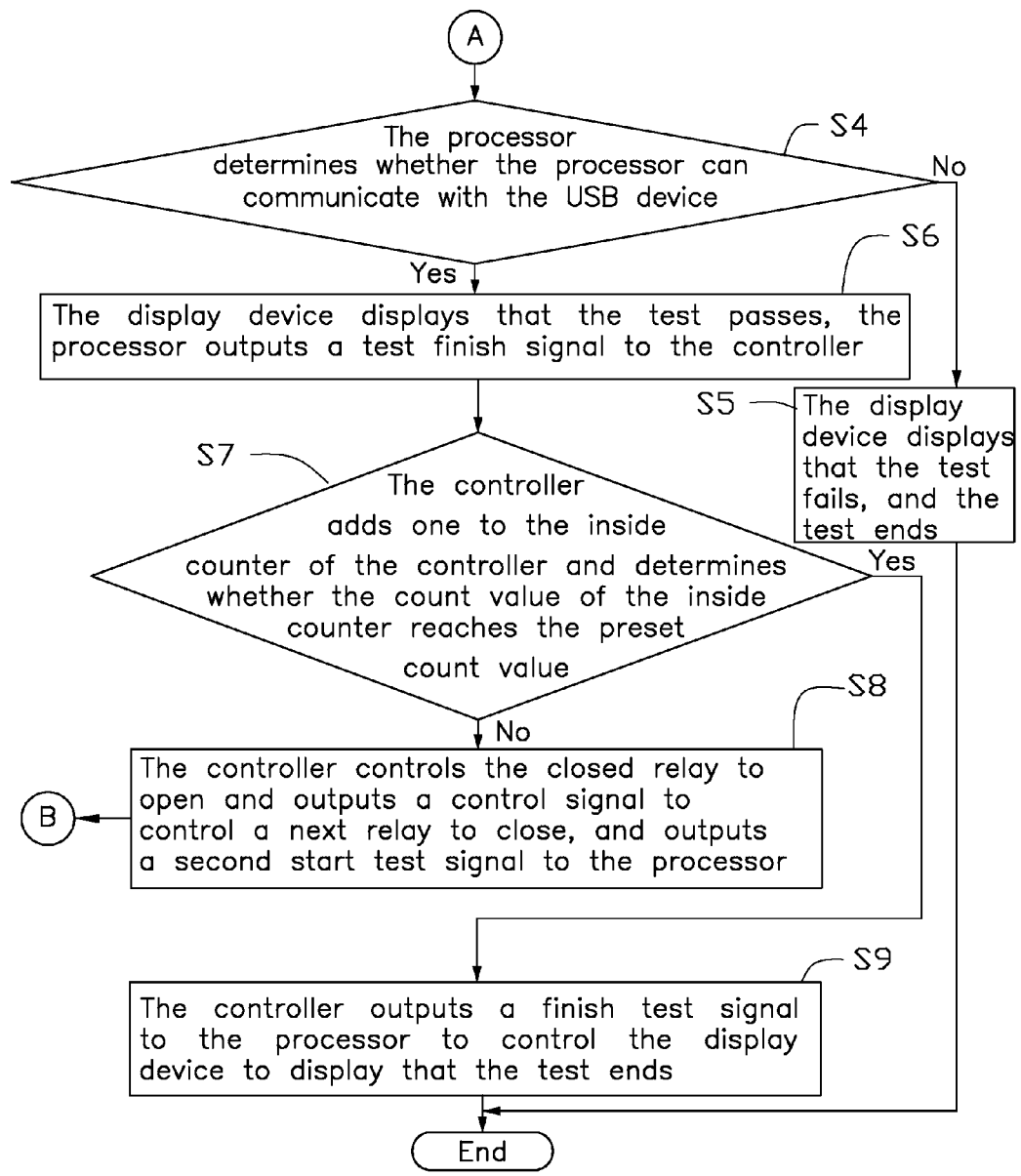

Referring to FIGS. 2A-2B, an exemplary embodiment of a test method for USB interfaces 21-24 of the motherboard 200 includes the following steps.

In step S1, the USB interfaces 21-24 of the motherboard 200 are connected to the USB interfaces 1-4 of the test apparatus 100 via cables 30, respectively, and the power switch 102 is turned on.

In step S2, the USB device 400 is connected to the USB interface 5 of the test apparatus 100 via the USB interface 410, the controller 104 identifies the USB device 400 and outputs a control signal to the relay 11 to close, and the controller 104 outputs a first start test signal to the processor 210 via the USB interfaces 1 and 21.

In step S3, the processor 210 reads the test programs from the storage device 220 according to the start test signal and executes the test programs.

In step S4, the processor 210 determines whether the processor 210 can communicate with the USB device 400, to test the USB interface of the motherboard 200 connected to the closed relay, if the processor 210 cannot communicate with the USB device 400, the procedure goes to step S5, if the processor 210 can communicate with the USB device 400, the procedure goes to step S6.

In step S5, the test ends when the display device 300 displays "fail".

In step S6, the processor 210 outputs a test finish signal to the controller 104 when the display device 300 displays "pass".

In step S7, the controller 104 adds one to the inside counter according to the test finish signal and determines whether the count value of the inside counter reaches the preset count value. If the count value does not reach the preset count value, the system proceeds to step S8. If the count value reaches the preset count value, the system proceeds to step S9.

In step S8, the controller 104 controls the closed relay to open and outputs a control signal to control a next relay to close, the controller 104 outputs a second start test signal to the processor 210, and the procedure goes back to step S3.

In step S9, controller 104 outputs a finish test signal to the processor 210, to control the display device 300 to display that the test ends.

When the test for the USB interfaces 21-24 of the motherboard 200 are completed, the USB device 400, such as the USB keyboard, can be removed from the USB interface 5 whereupon another USB device 400, such as a USB HDD, can be connected to the USB interface 5 of the test apparatus 100, to test the USB interfaces 21-24 of the motherboard 200.

The test apparatus 100 can test the USB interfaces of the motherboard 200 automatically, effectively, and seamlessly and thus offers a better method.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others skilled in the art to utilize the disclosure and various embodiments and with various modifications as are suited to the particular use contemplated. Alternately embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A test apparatus for testing universal serial bus (USB) interfaces of an electronic device, the test apparatus comprising:
    a plurality of first USB interfaces connected to the USB interfaces of the electronic device, respectively, to communicate with the electronic device;
    a second USB interface connected to a USB interface of a USB device and also connected to the plurality of first USB interfaces;
    a plurality of relays connected to the plurality of first USB interfaces, respectively;
    a controller connected to the plurality of relays and the second USB interface, the controller comprising a preset count value stored in an inside counter of the controller, wherein when the controller identifies the USB device connected to the second USB interface, the controller outputs a control signal to one of the plurality of relays to control the relay to close, and outputs a first start test signal to the electronic device to read test programs stored in the electronic device and execute the test programs to test the USB interface of the electronic device corresponding to the closed relay via a corresponding first USB interface of the test apparatus; wherein when the test for the USB interface of the electronic device corresponding to the closed relay is completed, the controller adds one to the inside counter and determines whether the count value of the inside counter reaches the preset count value; upon a condition that the count value reaches the preset count value, the controller outputs a finish test signal to the electronic device; and upon a condition that the count value does not reach the preset count value, the controller controls the closed relay to open and outputs a second start test signal to close a next relay to test a next USB interface of the electronic device corresponding to the now closed relay; and
    a power switch connected to the controller to turn on/off the controller.

2. A test method for testing universal serial bus (USB) interfaces of an electronic device, the test method comprising:
    providing a test apparatus connected between the electronic device and a USB device, wherein the test apparatus comprises a plurality of USB interfaces, a plurality of relays, a controller, and a power switch;
    identifying the USB device and outputting a control signal to control a relay to close, and outputting a first start test signal to the electronic device via the closed relay;
    reading test programs from the electronic device and executing the test programs;
    determining whether the electronic device can communicate with the USB device;
    displaying fail in response to the electronic device being not operable to communicate with the USB device;
    outputting a test finish signal to the controller in response to the electronic device being operable to communicate with the USB device;
    adding one to an inside counter of the controller according to the test finish signal, and determining whether a count value of the inside counter reaches a preset count value;
    in response to the count value of the inside counter not reaching the preset count value, controlling the closed relay to open, outputting a control signal to control a next relay to close, and outputting a second start test signal to the electronic device, and the process goes back to the step of "reading test programs from the electronic device and executing the test programs"; and
    in response to the count value of the inside counter reaching the preset count value, outputting a finish test signal to the electronic device and displaying that the test ends.

* * * * *